US005238758A

United States Patent [19]
Lee et al.

[11] Patent Number: 5,238,758
[45] Date of Patent: * Aug. 24, 1993

[54] BADIATION CURED SOLID ELECTROLYTES AND ELECTROCHEMICAL DEVICES EMPLOYING THE SAME

[75] Inventors: Mei-Tsu Lee, Centerville; Dale R. Shackle, Springboro; Gerhart Schwab, Chillicothe, all of Ohio

[73] Assignee: MHB Joint Venture, San Jose, Calif.

[*] Notice: The portion of the term of this patent subsequent to May 16, 2006 has been disclaimed.

[21] Appl. No.: 776,722

[22] Filed: Oct. 15, 1991

Related U.S. Application Data

[63] Continuation of Ser. No. 549,658, Jul. 9, 1990, abandoned, which is a continuation of Ser. No. 326,574, Mar. 21, 1989, abandoned, which is a continuation of Ser. No. 173,385, Mar. 25, 1988, Pat. No. 4,830,939, which is a continuation-in-part of Ser. No. 115,492, Oct. 30, 1987, abandoned.

[51] Int. Cl.$^5$ .............................. H01M 5/54
[52] U.S. Cl. ........................ 429/191; 429/192
[58] Field of Search ................ 429/191, 192

[56] References Cited

U.S. PATENT DOCUMENTS

| 4,303,748 | 12/1981 | Armand et al. | 429/192 |
|---|---|---|---|
| 4,357,401 | 11/1982 | Andre et al. | 429/192 |
| 4,556,614 | 12/1985 | Mehaute et al. | 429/191 |
| 4,589,197 | 5/1986 | North | 429/192 |
| 4,654,279 | 3/1987 | Bauer et al. | 429/192 |
| 4,681,822 | 7/1987 | Berthier et al. | 429/192 |
| 4,737,422 | 4/1988 | Knight et al. | 429/192 |
| 4,822,701 | 4/1989 | Ballard et al. | 429/192 |
| 4,908,283 | 3/1990 | Takahashi et al. | 429/192 |

FOREIGN PATENT DOCUMENTS

| 0145498 | 6/1985 | European Pat. Off. | |
| 0075779 | 5/1983 | Japan | 429/192 |

OTHER PUBLICATIONS

Xia et al, "Conductivities of Solid Polymer Electrolyte Complexes of Alkali Salts with Polymers of Methoxypolyethyleneglycol Methacrylates", Solid State Ionics 14 (1984) 221-224.

Primary Examiner—Prince Willis, Jr.
Assistant Examiner—M. Nuzzolillo
Attorney, Agent, or Firm—Burns, Doane, Swecker & Mathis

[57] ABSTRACT

A method for forming an interpenetrating polymeric network containing a liquid electrolyte for use in solid state electrochemical cells which comprises forming a mixture of a liquid monomeric or prepolymeric radiation polymerizable, compound, a radiation inert ionically conducting liquid, and an ionizable alkaline metal salt; subjecting said mixture to actinic radiation to thereby crosslink said radiation polymerizable ionically conducting material and form a solid matrix containing said ionically conducting liquid; and electrode half elements and electrochemical cells incorporating said network.

25 Claims, No Drawings

BADIATION CURED SOLID ELECTROLYTES AND ELECTROCHEMICAL DEVICES EMPLOYING THE SAME

CROSS REFERENCE TO RELATED APPLICATIONS

This application is a continuation-in-part of U.S. application Ser. No. 07/549,658, filed Jul. 9, 1990, which is a continuation of Ser. No. 07/326,574, filed Mar. 21, 1989, now abandoned, which is a continuation of Ser. No. 173,385, filed Mar. 25, 1988, now U.S. Pat. No. 4,830,939, which is a continuation-in-part of Ser. No. 115,492, filed Oct. 30, 1987, now abandoned.

BACKGROUND OF THE INVENTION

The present invention relates to the manufacture of solid state electrochemical devices and, more particularly, solid state electrochemical devices in which the electrolyte is a polymeric network interpenetrated by an ionically conducting liquid phase.

Solid state electrochemical devices are the subject of intense investigation and development. They are described extensively in the patent literature. See, for example U.S. Pat. No. 4,303,748 to Armand; U.S. Pat. No. 4,589,197 to North; U.S. Pat. No. 4,547,440 to Hooper et al. and U.S. Pat. No. 4,228,226 to Christiansen. These cells are typically constructed of an alkali metal foil anode, an ionically conducting polymeric electrolyte containing an ionizable alkali metal salt, and a finely divided transition metal oxide as a cathode.

Bauer et al., U.S. Pat. No. 4,654,279, describes a cell in which the electrolyte is a two phase interpenetrating network of a mechanically supporting phase of a continuous network of a crosslinked polymer and an interpenetrating conducting liquid polymer phase comprising an alkali metal salt of a complexing liquid polymer which provides continuous paths of high conductivity throughout the matrix. In one embodiment, a liquid complex of a lithium salt and polyethylene oxide is supported by an epoxy, a polymethacrylate, or a polyacrylonitrile matrix.

The network is formed by preparing a solution of the metal salt, the salt-complexing liquid polymer, and the monomer for the crosslinked supporting phase in a polar solvent. The solvent is evaporated to form a dry layer of a mixture of the remaining materials. The dry layer is then cured.

Le Mehaute et al., U.S. Pat. No. 4,556,614, discloses a solid electrolyte for an electrochemical cell in which a salt complexing polymer is mixed with a miscible and crosslinkable second polymer. The function of the second polymer is to maintain the complexing polymer in a more highly conductive amorphous state. This is accomplished by forming a solution of the two polymers and an ionizable salt in a solvent, evaporating the solvent, and crosslinking the second polymer. The second polymer is crosslinked by radiation.

Andre et al., U.S. Pat. No. 4,357,601, generally relates to crosslinked polymeric electrolytes containing heteroatoms. The compositions described in the patent are chemically crosslinked, for example, through the reaction of a polyol and a polyisocyanate.

Xia et al., "Conductivities of Solid Polymer Electrolyte Complexes of Alkali Salts with Polymers of Methoxypolyethyleneglycol Methacrylates," *Solid State Ionics*, 14, (1984) 221-24 discloses solid polymeric electroytes of ionizable salts and polymers prepared by polymerizing oligo-oxyethyl methacrylates. Reference is made at the end of the paper to experiments with radiation cross-linking. The polymers ranged from 150,000 to 300,000 in molecular weight.

SUMMARY OF THE INVENTION

A principal object of the present invention is to provide a method for forming a polymeric electrolyte for use in solid sate electrochemical cells and, more particularly, to provide a method for manufacturing the anode and/or cathode half elements of such cells or the cells themselves; and to provide electrolytes, anode and cathode half elements and electrochemical cells formed by such a method.

In accordance with the present invention the electrolyte is formed by preparing a mixture of a liquid monomeric or prepolymeric radiation polymerizable compound, a radiation inert ionically conducting liquid, and an ionizable alkali metal salt, and curing the mixture by exposing it to actinic radiation. In accordance with the preferred embodiments of the invention, the mixture is cured by exposure to ultraviolet or electron beam radiation. Where ultraviolet radiation is used, the mixture will additionally include an ultraviolet initiator.

The radiation polymerizable electrolyte composition may be coated upon a support or placed in a mold prior to exposure. Exposure of the mixture produces a polymerized or crosslinked (where trifunctional monomers are used) matrix which is interpenetrated by the radiation inert ionically conducting liquid phase. In accordance with the most typical embodiments of the invention, the radiation polymerizable compounds are preferably low molecular weight polyethylenically unsaturated compounds and still more preferably compounds having at least one heteroatom in the molecule which is capable of forming donor acceptor bonds with an alkali metal cation and having at least two terminal polymerizable ethylenically unsaturated moieties. When polymerized, these compounds form an ionically conductive matrix. The radiation inert liquid is preferably a polar aprotic solvent or a solvent having heteroatoms capable of forming donor acceptor bonds with alkali metal cations such as polyethylene glycol dimethyl ether.

The method of the present invention can be used to manufacture anode and cathode half elements as well as electrochemical cells. Anode half elements are prepared by coating the radiation polymerizable electrolyte composition described above on an appropriate anodic material such as lithium metal on nickel or copper foil; and conveying the coated foil member past a radiation source. After exposure, the foil emerges with the ion conductive network adhered to its surface. This not only provides intimate contact between the foil and the electrolyte but it also protects the underlying foil surface from damage during subsequent manufacturing operations in which it is assembled with the cathode element.

In accordance with one method of the present invention, a method for providing a cathode half element is provided. In this method, a mixture of an active cathode material, an electronic conductor, a liquid monomeric or prepolymeric radiation polymerizable polyethylenically unsaturated compound, a radiation inert ionically conducting liquid, and optionally an ionizable alkali metal salt is prepared; this mixture is coated on a foil member which functions as a current collector, and exposed to actinic radiation to polymerize the polyethlenically unsaturated compound. In some cases the ionizable alkali metal salt may be omitted from the radiation polymerizable cathode composition to facilitate coating. An excess of an ionically conductive salt may be incorporated in the electrolyte layer which subsequently diffuses into the cathode layer when the cell is assembled.

The present invention is also useful in manufacturing a completed electrochemical cell. In accordance with one method, anode and cathode half elements prepared by any process may be assembled with a layer of a radiation polymerizable electrolyte composition in accordance with the present invention therebetween, and the assembly may be exposed to radiation to cure the electrolyte layer and thereby adhere the anode and cathode half elements together.

Other methods may also be used. For example, cured anode and cathode half elements prepared in accordance with the present invention may be assembled using heat and pressure in a conventional manner. Alternatively, a cured anode or cathode half element prepared by any process may be assembled with an uncured anode or cathode half element in accordance with the present invention and the assembly may be exposed to radiation to adhere the two elements together. In accordance with still another method of the present invention, uncured anode and cathode half elements carrying radiation polymerizable compositions in accordance with the present invention may be assembled and the assembly may be exposed to radiation to cure the elements and at the same time secure the cell together. It will also be apparent that a foil member may be coated with a radiation polymerizable electrolyte and cathode compositions in accordance with the present invention, assembled with the foil member forming the anode or the current collector for the cathode, and this assembly may be cured.

Accordingly, one manifestation of the present invention is a method for forming an interpenetrating polymeric network containing a liquid electrolyte for use in solid state electrochemical cells which comprises forming a mixture of a liquid, monomeric or prepolymeric radiation polymerizable compound, a radiation inert ionically conducting liquid, and an ionizable alkali metal salt; subjecting said mixture to actinic radiation to thereby crosslink said radiation polymerizable compound and thereby form a solid matrix containing said ionically conducting liquid.

Another manifestation of the present invention is a method for forming an anode half element which comprises coating an anodic metal foil member with a mixture which includes the aforementioned radiation polymerizable material, a radiation inert ionically conducting liquid, and an ionizable alkali metal salt; and subjecting said mixture to actinic radiation to thereby crosslink said radiation polymerizable compound and form a solid matrix containing said ionically conducting liquid.

The present invention also provides a method for forming a cathode half element which comprises forming a mixture of an active cathode material, an electronic conductor, a liquid monomeric or prepolymeric radiation polymerizable compound, a radiation inert ionically conducting liquid, and optionally, an ionizable alkali metal salt; coating said mixture on a metal foil member; and exposing said mixture to radiation to cure said radiation polymerizable polyethylenically unsaturated compound and thereby form a polymeric network interpenetrated by said ionically conducting liquid.

A further method in accordance with the present invention is a method for forming an electrochemical cell which comprises assembling an anode and a cathode half element having a radiation polymerizable electrolyte composition therebetween including a liquid monomeric or prepolymeric radiation polymerizable compound, a radiation inert ionically conducting liquid, and an ionizable alkali metal salt; and exposing the assembly to radiation to polymerize the radiation polymerizable compound and thereby secure the anode and cathode half elements together via a polymeric network interpenetrated by said ionically conducting liquid.

Still another method in accordance with the present invention comprises coating an anodic metal foil member with a radiation polymerizable electrolyte composition including a liquid monomeric or prepolymeric radiation polymerizable compound, a radiation inert ionically conducting liquid, and an ionizable alkali metal salt; overcoating said radiation polymerizable electrolyte composition with a radiation polymerizable cathode composition including an active cathode material, an electronic conductor, a liquid monomeric or prepolymeric radiation polymerizable compound, a radiation inert ionically conducting liquid, and optionally an ionizable alkali metal salt; overlaying said radiation polymerizable cathode composition with a foil member functioning as a current collector for said cathode, and exposing the laminate so obtained to radiation to polymerize the radiation polymerizable compound and thereby form an electrochemical cell. This process may be reversed in accordance with which the current collector for the cathode may be coated with a radiation polymerizable cathode composition which is overcoated with the radiation polymerizable electrolyte composition described above. This material is assembled with an anodic metal foil member and exposed to radiation.

DETAILED DESCRIPTION OF THE INVENTION

The network which is interpenetrated by the ionically conducting liquid in the present invention may be a conductive matrix in which case it is formed from monomers containing heteroatoms capable of forming donor acceptor bonds with an alkali metal cation; or a non-conductive supportive matrix in which case the aforesaid heteroatoms are not present. The preferred monomers or prepolymers are described below.

Polyethylenically unsaturated monomeric or prepolymonomeric materials useful in the present invention are preferably compounds having at least one, and more preferably a plurality, of heteroatoms (particularly oxygen and/or nitrogen atoms) capable of forming donor acceptor bonds with an alkali metal cation and are terminated by radiation polymerizable moieties. These compounds yield a conductive supportive matrix. More specifically they are preferably low molecular weight oligomers of the formulae (I)–(III) below

 (I)

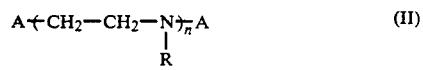 (II)

-continued

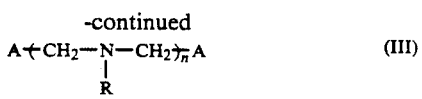

where n is about 3 to 50 and R is hydrogen or a C1–C3 alkyl group, which are terminated by ethylenically unsaturated moieties or glycidyl moieties represented by A.

A particularly useful group of radiation polymerizable compounds is obtained by reacting a polyethylene glycol with acrylic or methacrylic acid. Also useful in the present invention are radiation curable materials such as acrylated epoxies, e.g., Bisphenol A epoxy diacrylate, polyester acrylates such as Uvithane ZL-1178 an acrylate functionalized polyurethane available from Morton Thiokol Chemical Company, copolymers of glycidyl ethers and acrylates or a vinyl compound such as N-vinylpyrrolidone. The latter provides a non-conductive matrix. In selecting these monomers, monomers are selected which do not adversely react with the anodic metal which tends to be highly reactive. For example, halogenated monomers such as vinyl chloride are preferably avoided. Monomers which react with the anodic metal, but which react with it very slowly may be used, but are not desirable.

Preferably, the radiation polymerizable polyethylenically unsaturated compounds have a molecular weight of about 200 to 2,000 and more preferably 200 to 800. Still more preferably they are liquids at temperatures less than 30° C. Examples of radiation curable materials include polyethylene glycol-300 diacrylate (average PEO molecular weight about 300), polyethylene glycol-480 diacrylate (average PEO molecular weight about 480) and the corresponding methacrylates.

It may be desirable to include a radiation curable comonomer in the composition to reduce the glass transition temperature and improve conductivity of the polymer. Any suitable monoacrylate such as tetrahydrofurfuryl acrylate, tetrahydrofurfuryl methacrylate, methoxypolyethylene glycol monomethacrylate, 2-ethoxyethyl acrylate, 2-methoxyethyl acrylate or cyclohexyl methacrylate may be used for this purpose. Triacrylates such as TMPTA, trimethylolpropane ethoxylated triacrylate (TMPEOTA) or trimethylolpropane propoxy triacrylate may be used to introduce crosslinking of the polymer. There should be sufficient rigidity in the layers maintaining separation of the anode and cathode that the cell does not discharge with handling. Monoacrylates may be used in an amount of about 5 to 50% by weight based on the total amount of radiation polymerizable material. The triacrylates are used in amounts of about 2 to 30% by weight on the same basis.

The supportive matrix may be formed in whole or in part from the radiation curable compound. As illustrated in Examples 12 and 13 amounts of higher molecular weight PEO may be added to the composition.

The radiation inert liquids which form the ionically conductive liquid interpenetrating phase can be any low volatile aprotic polar solvent. Preferably, these materials are characterized by a boiling point greater than about 80° C. Representative examples are propylene carbonate, γ-butryrolactone, 1,3-dioxolane, and 2-methyltetrahydrofuran. Less polar solvents having heteroatoms capable of bonding alkali metal cations are also useful. Low volatility simplifies manufacture and improves shelf life. Polyethylene glycol dimethyl ether (PEGDME) is a preferred example. Glymes such as tetraglyme, hexaglyme, and heptaglyme are also desirable solvents.

The radiation curable mixture of this invention contains at least 45% by weight of the radiation inert liquid and about 20 to 55% by weight and preferably 25 to 40% by weight of the radiation polymerizable compound. The exact amount of the radiation polymerizable compound and the radiation inert liquid should be adjusted to provide the optimum combination of strength and conductivity for the particular application. As a general rule, if the mixture contains less than about 20% of the polymerizable compound, the electrolyte will be too weak to maintain electrode separation. If the mixture contains greater than about 55% polymerizable material, the electrolyte exhibits poor conductivity. In those cases in which the electrolyte composition itself or an electrode composition containing the electrolyte is coated on a supporting member, such as a current collector or an electrode half element, the electrolyte often is not required to have the structural integrity of a free standing film. In those applications it is permissible and advantageous to use a higher quantity of the radiation inert liquid because greater conductivity can be achieved, for example it is advantageous to use about 70 to 80% of the radiation inert liquid.

Ionizable alkaline metal salts useful in this invention include those salts conventionally used in solid state electrochemical cells. Representative examples are sodium, lithium, and ammonium salts of less mobile anions of weak bases having a large anionic radius. Examples may be selected from the group consisting of $I^-$, $Br^-$, $SCN^-$, $ClO_4^-$, $BF_4^-$, $PF_6^-$, $AsF_6^-$, $CF_3COO-$, $CF_3SO_3-$, etc. Specific examples are $LiClO_4$, $NaClO_4$, $LiF_3CSO_3$, and $LiBF_4$.

The salt may be used up to an amount which does not exceed its solubility limit in the electrolyte. The amount will therefore vary with the nature of the radiation polymerizable material and the radiation inert liquid solvent. As a general rule, the maximum amount of salt within its solubility limit should be used to maximize the ionic conductivity of the electrolyte. In most applications about 10 to 60 parts salt is used per 100 parts of radiation inert liquid phase.

The method of the present invention can be used to produce free standing films or electrode half elements. To produce a free standing film, the radiation curable mixture may be poured into a mold or coated onto a surface having a release characteristic such as PTFE and cured by exposure to actinic radiation. The electrolyte film thickness can vary but films about 15 to 100 microns thick and preferably 20 to 50 microns thick are useful in many applications. The obtained film can be assembled with cathode and anode half elements prepared by the processes disclosed herein or prepared by other processes and laminated under heat and pressure. A conductive adhesive my be used if necessary.

Anode half elements are obtained by coating a foil of the anode metal with the radiation curable composition and exposing to radiation. A typical foil is lithium foil or lithium coated foil such as nickel or copper foil having a layer of lithium deposited on its surface. Lithium is preferred because it is very electropositive and light in weight. The radiation curable composition may be coated in any manner. Suitable techniques are rod coating, roll coating, blade coating, etc.

Coating compositions for cathode half elements include particles of the insertion compound and an electrically conductive material. The cathode half element is obtained by coating a foil member such as nickel foil with the aforesaid composition in a thickness of about 10 to 100 microns and preferably about 30 to 60 microns, and curing. The cathode composition may be coated by any of the techniques discussed previously, but it is particularly desirable to design an extrudable cathode composition. The radiation curable composition used in the present invention functions as a dispersing medium for the cathode materials. A typical coating formulation for a cathode half element may contain about 50 to 80 parts of the insertion compound, about 2 to 15 parts of a conductive particle such as carbon black and about 15 to 50 parts of the radiation curable composition described above. As previously indicated the ionizable salt can be omitted from the cathode composition if it is able to diffuse into the cathodes after assembly with the electrolyte. It may enhance the extrudability of the cathode composition to omit the salt and rely upon its diffusion within the electrochemical cell to fill the cathode. Also, for extrudability, it may be desirable to use a higher amount of ionically conductive liquid in the cathode composition and less in the electrolyte composition and to rely upon diffusion to balance the concentration when the cell is formed.

Insertion compounds and electronically conductive materials useful in the present invention are well known in the art. Representative examples of insertion compounds are $V_6O_{13}$, $MoO_2$, $MnO_2$ and $TiS_2$. Other examples can be found in the aforementioned references. A conductive material is carbon black. Certain conductive polymers (which are characterized by a conjugated network of double bonds) like polypyrol and polyacetylene may also be used for this purpose.

In accordance with a further embodiment of the invention, the composite cathodic particles described in U.S. Pat. No. 4,576,883 to Hope can be dispersed in the curable composition and coated on a metal foil member as described above.

In preparing the coating compositions for the cathode half element, a small amount of a volatile solvent and a dispersing agent such as lecithin can be added to disperse the cathodic material in the composition and produce a composition having good coating characteristics.

The term "actinic radiation" as used herein includes the entire electromagnetic spectrum and electron beam and gamma radiation. It is anticipated, however, based on availability of radiation sources and simplicity of equipment that electron beam and ultraviolet radiation will be used most often. Electron beam and gamma radiation are advantageous because they do not require the presence of a photoinitiator. When a photoinitiator is required, for example when using ultraviolet radiation, initiators selected from among conventional photoinititors may be used. When using electron beam, the beam potential must be sufficiently high to penetrate the electrode layer, the anode or cathode half element, or the cell itself depending upon which manufacturing technique is adopted. Voltages of 175 to 300 KV are generally useful. The beam dosage and the speed with which the element traverses the beam are adjusted to control the degree of crosslinking in an otherwise known manner.

It will be apparent from the foregoing description that the methods of the present invention can also be used to manufacture a complete electrochemical cell. Cured anode and cathode half elements prepared as above can be laminated together under heat and pressure in an otherwise known manner. Alternatively, however, the electrochemical device can be assembled "wet" and then cured in situ. For example, in accordance with the present invention, a lithium coated foil member can be coated with the radiation polymerizable electrolyte composition and overcoated with the cathode coating composition described previously; or a nickel foil member can be coated with the cathode coating composition described previously and overcoated with the radiation polymerizable electrolyte composition. These structures can be cured by exposure to electron beam or another source of actinic radiation and the current collector or anodic member can be assembled with it. In another embodiment the foil members associated with both the anode and the cathode half elements may be assembled to form the completed cell and this structure may be cured by electron beam as shown in Example 11.

Thus, in one method a current collector such as a nickel foil member may be coated with a radiation polymerizable cathode composition in accordance with the present invention. This structure is overcoated with a layer of the radiation polymerizable electrolyte composition described above and assembled with an anodic member such as a lithium foil member or a lithium coated nickel or aluminum member. This assembly may be cured by exposure to electron beam to provide an electrochemical cell. The cured electrolyte and cathode compositions adhere to one another as well as to the metal foil members associated with the anode and cathode.

The process described above can also be reversed. An anodic metal foil member such as lithium coated metal foil can be coated with the radiation polymerizable electrolyte composition described above. The radiation polymerizable cathode composition is coated over the electrolyte composition and a nickel foil member or other current collector is applied to the cathode layer. The assembly is subjected to electron beam radiation to produce an electrochemical cell in accordance with the present invention.

In another process, the anodic foil member or the current collector may be coated with the appropriate cathode or electrolyte composition and that composition may be cured (e.g., by exposure to radiation when it is radiation curable). The cured composition may be overcoated with the other of the electrolyte or cathode composition thereafter, and the overcoating may be cured or the remaining anodic foil member or current collector may be laminated and then the overcoating cured.

Other methods for manufacturing anodes, cathodes, or electrochemical cells will also be evident which utilize the radiation polymerizable electrolyte composition of the present invention. It has been found that this composition is effective in bonding the anode and cathode elements together and, at the same time, provides a polymeric matrix interpenetrated by an ionically conductive liquid.

The invention is illustrated in more detail by way of the following non-limiting examples.

EXAMPLE 1

1 g of poly(ethylene glycol) diacrylate, M.W. 300, 1 g of poly(ethylene glycol) dimethyl ether, M.W. 400, and 0.3 g of lithium trifluoromethane sulfonate were mixed together. Benzophenone, 0.1 g was then added and the mixture, as a thin layer, poured into an aluminum weighing dish. This mixture was irradiated in an Argon atmosphere for 1 minute with GE F40/BLB blacklight, (output range from 300–420nm and output maximum slightly above 350nm). The exposure transformed the liquid mixture into a flexible, opaque film with a dry feel. Its ionic conductivity is $2.8 \times 10^{-5}$ ohm$^{-1}$ cm$^{-1}$.

EXAMPLE 2

0.5 g of poly(ethylene glycol) diacrylate, 0.5 g of poly(ethylene glycol) diglycidyl ether, 1 g of poly(ethylene glycol) dimethyl ether and 0.6 g of lithium trifluoromethane sulfonate were mixed together, 0.1 g of benzophenone was then added and then the mixture irradiated in an aluminum weighing dish, using the same U.V. lamp as in Example 1. The flexible, opaque film had an ionic conductivity of $2.7 \times 10^{-5}$ ohm$^{-1}$ cm$^{-1}$.

EXAMPLE 3

2 g of poly(ethylene glycol)diacrylate, avg. M.W. 300, 2 g of poly(ethylene glycol)dimethyl ether, avg. M.W. 400, and 0.6 g of lithium trifluoromethane sulfonate were mixed together. This mixture was then coated on aluminum foil and irradiated by electron beam with 3 Megarads at 20 ft/min. (Energy Science Inc.). This resulted in a clear and flexible dry film.

EXAMPLE 4

2 g of UVITHANE ZL-1178. 2 g of poly(ethylene glycol) dimethylether and 0.6 g of lithium trifluoromethane sulfonate were mixed together. UVITHANE ZL-1178 is a diacrylate functionalized polyurethane with ether portions built up from poly(propylene glycol) from Morton Thiokol Chemical Co. This mixture was then coated on aluminum foil and irradiated by electron beam with 3, 6, 9 and 12 MR (Megarads) at 20 ft/min.(fpm). This resulted in clear and flexible dry films.

EXAMPLE 5

Onto a sheet of industrial strength aluminum foil was coated with a drawdown bar a film of the following mixture:

| | |
|---|---|
| Poly(ethylene glycol)diacrylate (avg. M.W. of PEO 300) | 2.0 g |
| Poly(ethylene glycol) dimethyl ether (avg. M.W. of PEO 400) | 2.0 g |
| Lithium trifluoromethane sulfonate | 0.6 g |

The coated foil was passed through the path of an electron beam emitting source at a speed of 20 fpm. Doses of 3, 6, 9, and 12 MR were used. In all four cases a polymer film cured onto the aluminum foil was obtained. The resulting ionic conductivities on the order of $10^{-5}$ (ohm$^{-1}$ cm$^{-1}$).

EXAMPLE 6

Onto a sheet of industrial strength aluminum foil was coated with a drawdown bar a film of the following mixture:

| | |
|---|---|
| Poly(ethylene glycol)diacrylate (avg. M.W. of PEO 300) | 2.0 g |
| Poly(ethylene glycol) dimethyl ether (avg. M.W. of PEO 400) | 1.0 g |
| Lithium trifluoromethane sulfonate | 0.1 g |
| Unitized $V_6O_{13}$ particles [70% $V_6O_{13}$, 20% PEO (M.W. 400,000) | 1.0 g |
| 10% Shawinigan carbon prepared as described in U.S. Pat. No. 4,576,883] | |

The coated aluminum foil was passed through the path of an electron beam emitting source at a speed of 20 fpm and dosage of 12 MR. A black flexible polymer film on an aluminum was the result.

EXAMPLE 7

Onto a sheet of industrial strength aluminum foil was coated with a drawdown bar a film of the following mixture:

| | |
|---|---|
| Poly(ethylene glycol)diacrylate (avg. M.W. of PEO 300) | 2.5 g |
| Poly(ethylene glycol) dimethyl ether (avg. M.W. of PEO 400) | 2.8 g |
| Uvithane ZL-1178 | 2.8 g |
| Lithium trifluoromethane sulfonate | 0.84 g |
| Unitized $V_6O_{13}$ | 3.0 g |

The coated foil was passed through the path of an electron beam source at a speed of 20 fpm and a dose of 12 MR. This resulted in curing the liquid film into a flexible black polymer on aluminum foil.

EXAMPLE 8

Onto a sheet of industrial strength aluminum foil was coated with a drawdown bar a film of the following mixture which had been ground in a ball mill to the desired particle size.

| | |
|---|---|
| $V_6O_{13}$ | 35 g |
| Lecithin | 0.75 g |
| Methylethyl ketone (MEK) | 33 g |
| Heptaglyme | 15 g |
| Carbon black | 3.5 g |
| Polyethylene Glycol Diacrylate | 15. g |

The solvent (MEK) was allowed to evaporate. The resulting film was then passed through the path of an electron beam source at a speed of 50 fpm and a dose of 12 Megarads. This gave a cured flexible black film useful as a cathode half element.

EXAMPLE 9

A film was prepared as in Example 8 without curing. A mixture of pre-polymer electrolyte as in Example 5 was then coated on top of it. This sample was then passed through the path of an electron beam source at a speed of 50 fpm and a dose of 12 MR. This gave a cured, glossy black film which could be assembled with another foil member for use as an electrochemical device.

EXAMPLE 10

A coating was prepared and cured as in Example 8. A mixture of pre-polymer electrolyte as in Example 5 was then coated on top of it. This sample was then passed through electron beam source at a speed of 50 fpm and a dose of 3 MR. This gave a cured black film which could be assembled with another foil member for use as an electrochemical device.

EXAMPLE 11

The coatings were prepared as describe in Example 9. The coatings were then covered with nickel foil. This construction was then cured by passage through an electron beam operating at 175 KV, a dosage of 6 MR and a speed of 20 fpm to provide an electrochemical device. Nickel foil was selected merely to demonstrate that the electrode and electroylyte compositions could be cured by electron beam through the foil. To prepare an electrochemical cell, the cathode composition of Example 8 would be coated on a lithium foil member or a lithium coated member in a dry room.

EXAMPLE 12

The radiation curable extrudable polymer electrolyte compositions containing polyethylene oxide (PEO), polyethylene glycol diacrylate, (PEG-DA), trimethylolpropane ethoxylated triacrylate (TMPEOTA), LiCF$_3$SO$_3$ and a suitable ionic conductive solvent such as tetraglyme or propylene carbonate were made and extruded on aluminum foil using a Brabender extruder at 125° C. as shown in the Table below. The extrusion mixture was prepared as follows: First, the salt was dissolved in half of the propylene carbonate. The PEO is dispersed in the other half of the propylene carbonate, then PEG-DA and TMPEOTA are added to the mixture. The salt and the PEO compositions are mixed and the mixture is poured into the input of the extruder.

TABLE

| Compound | Sample No. (wt. %) | | | |
|---|---|---|---|---|
| | 1 | 2 | 3 | 4 |
| PEG—DA (400) | — | — | 0.04 | 0.10 |
| TMPEOTA | 0.03 | 0.13 | 0.01 | 0.01 |
| Tetraglyme | 0.70 | 0.60 | 0.75 | 0.65 |
| PEO | 0.20 | 0.20 | 0.05 | 0.10 |
| LiCF$_3$SO$_3$ | 0.07 | 0.07 | 0.15 | 0.14 |

Samples 1–4 were then passed through the electron beam at 7.8 MR to give flexible, opaque films about 1 to 5 mils thick having a conductivity of $7 \times 10^{-5}$ ohm$^{-1}$ cm$^{-1}$.

EXAMPLE 13

The following mixtures containing propylene carbonate (PC) were also made:

| Compound | Sample No. (wt. %) | |
|---|---|---|
| | PC-1 | PC-2 |
| PEG—DA | 0.10 | 0.10 |
| TMPEOTA | 0.01 | 0.01 |
| PC | 0.65 | 0.65 |
| PEO | 0.10 | 0.05 |
| LiCF$_3$SO$_3$ | 0.14 | 0.19 |

The materials were extruded under the same conditions described in Example 2 and passed through the electron beam to give clear, flexible films having a conductivity of $2 \times 10^{-3}$ ohm$^{-1}$ cm$^{-1}$.

EXAMPLE 14

Cathode mixtures containing 50% V$_6$O$_{13}$, 7% Shawinigan Black and 43% of compositions PC-1 and PC-2 from Example 13 were extruded onto nickle or aluminum foil under the same conditions as described above and cured by electron beam at 7.8 MR.

EXAMPLE 15

Batteries were made as follows:
(1) Extruding the cathode composition of Example 14 on aluminum foil;

(2) Curing the cathode composition by electron beam as in Example 14;
(3) Extruding composition PC-2 from Example 13 on top of the cured cathode composition;
(4) Laminate with lithium foil;
(5) Passing the structure through an electron beam at 7.8 MR. The lithium foil retained its property during this process.

EXAMPLE 16

Batteries were made as follows:
(1) Extruding the cathode composition of Example 14 on aluminum foil;
(2) Curing the cathode composition by electron beam as in Example 14;
(3) Extruding composition PC-2 from Example 13 on top of the cured cathode composition;
(4) Passing the coating through the electron beam at 7.8 MR;
(5) Laminating lithium foil to the laminate of step (4) by heat and/or pressure roll.

Having described the invention in detail and by reference to preferred embodiments thereof, it will be apparent that modifications and variations are possible without departing from the scope of the appended claims.

What is claimed is:

1. A radiation curable composition useful in forming a solid electrolyte, said composition consisting essentially of a liquid monomeric or prepolymeric radiation polymerizable, polyethylenically unsaturated compound, at least 45% by weight of a radiation inert ionically conducting liquid and an ionizable ammonium or alkali metal salt wherein said ionically conducting liquid is an aprotic solvent and said polymerizable compound includes a repeating unit selected from the group consisting of

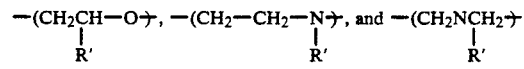

where R' is hydrogen or a lower alkyl group and wherein said radiation polymerizable, polyethylenically unsaturated compound upon exposure to radiation is capable of producing a matrix which is interpenetrated by said ionically conducting liquid.

2. The composition of claim 1 wherein said radiation polymerizable compound is selected from the group consisting of the formulas I to III below:

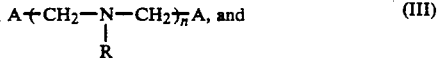

wherein A represents an ethylenically unsaturated moiety or a glycidyl moiety, R is hydrogen or a C$_1$-C$_3$ alkyl group, and n is a polyethylene glycol modified compound selected from the group consisting of about 3 to 50.

3. The composition of claim 1 wherein said radiation polymerizable compound is a polyethylene glycol modified to include terminal ethylenically unsaturated groups or an acrylate functionalized polyurethane.

4. The composition of claim 3 wherein said radiation polymerizable compound is a polyethylene glycol modified compound selected from the group consisting of polyethylene glycol diacrylate, polyethylene glycol dimethacrylate, and polyethylene glycol diglycidyl ether.

5. The composition of claim 4 wherein said ionically conducting liquid is polyethylene glycol dimethyl ether.

6. The composition of claim 4 wherein said radiation polymerizable compound is a mixture of a difunctional and a trifunctional polyethylenically unsaturated compound.

7. The composition of claim 1 wherein said salt is a salt of a cation selected from the group consisting of lithium, sodium, potassium, and ammonium cations; and an anion selected from the group consisting of I−, Br−, SCN− ClO$_4$−, CF$_3$SO$_3$−, BF$_4$−, PF$_6$−, AsF$_6$−, and CF$_3$COO−.

8. The composition of claim 1 wherein said radiation is ultraviolet radiation or electron beam radiation.

9. The composition of claim 1 where said composition is cured by exposure to actinic radiation.

10. The composition of claim 9 wherein said actinic radiation is electron beam radiation.

11. The composition of claim 9 wherein said actinic radiation is ultraviolet radiation.

12. The composition of claim 11 including an ultraviolet initiator.

13. The composition of claim 1 wherein said radiation polymerizable compound upon exposure to actinic radiation produces a polymerized or crosslinked matrix which is interpenetrated by said ionically conducting liquid.

14. A radiation curable composition useful in forming a solid electrolyte, said composition consisting essentially of:
a liquid monomeric or prepolymeric radiation polymerizable, polyethylenically unsaturated compound,
at least 45% by weight of a radiation inert ionically conducting liquid and
an ionizable ammonium or alkali metal salt
wherein said ionically conducting liquid is an aprotic solvent and wherein said radiation polymerizable, polyethylenically unsaturated compound upon exposure to radiation is capable of producing a matrix which is interpenetrated by said ionically conducting liquid.

15. The composition of claim 14 wherein said aprotic solvent is selected from the group consisting of propylene carbonate, gamma-butyrolactone, 1,3-dioxolane, 2-methyltetrahydrofuan, tetraglyme, hexaglyme, and heptaglyme.

16. The composition of claim 15 wherein said radiation inert liquid is present in said mixture in an amount of at least 70% by weight.

17. The composition of claim 15 wherein said radiation polymerizable compound is poly (ethylene glycol-300) diacrylate and said radiation inert ionically conducting liquid is propylene carbonate.

18. The composition of claim 14 where said composition is cured by exposure to actinic radiation.

19. The composition of claim 18 wherein said actinic radiation is electron beam radiation.

20. The composition of claim 18 wherein said actinic radiation is ultraviolet radiation.

21. The composition of claim 20 including an ultraviolet initiator.

22. The composition of claim 18 wherein said actinic radiation is visible light.

23. The composition of claim 14 wherein said radiation polymerizable compound upon exposure to actinic radiation produces a polymerized or crosslinked matrix which is interpenetrated by said ionically conducting liquid.

24. The composition according to claim 14 wherein the ionically conducting liquid is propylene carbonate.

25. The composition according to claim 14 wherein said radiation polymerizable compound is an acrylate functionalized polyurethane and said ionically conducting liquid is propylene carbonate.

* * * * *